(No Model.)
C. SCHMALZRID.
FERTILIZER DISTRIBUTER.
No. 453,799. Patented June 9, 1891.
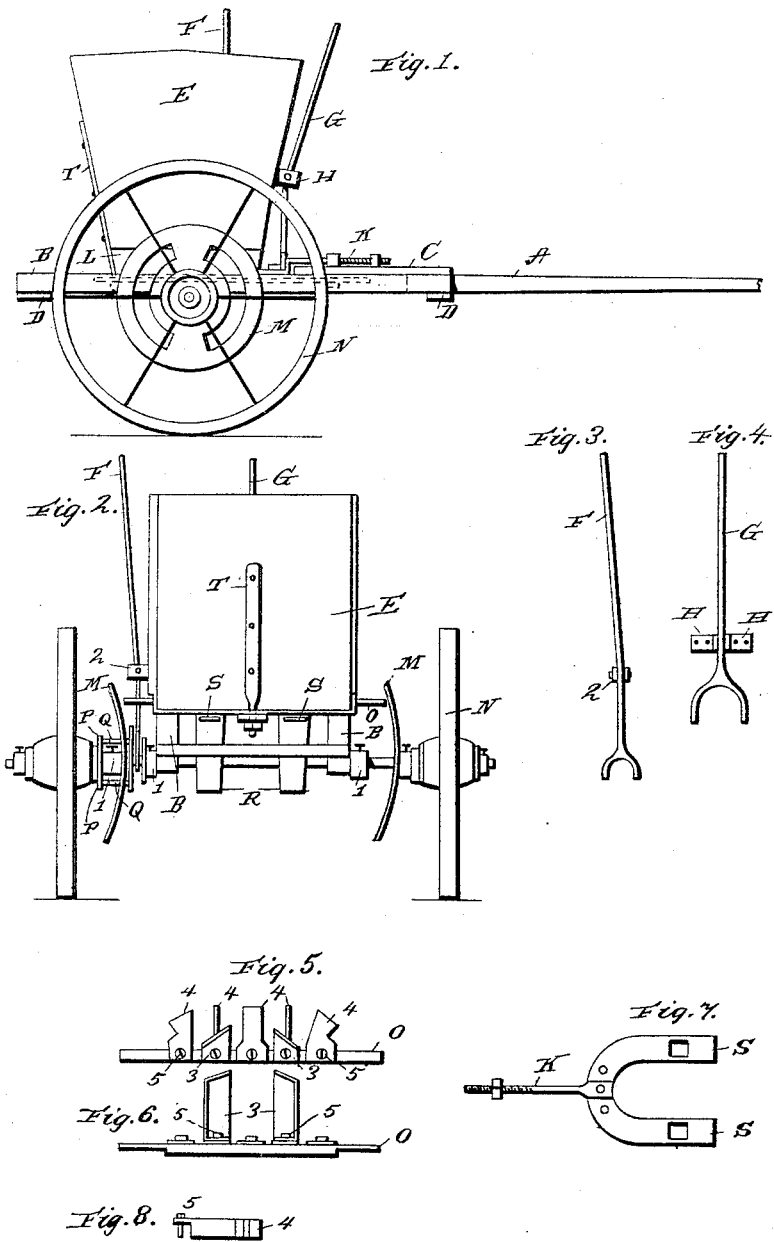

UNITED STATES PATENT OFFICE.

CHRISTIAN SCHMALZRID, OF NEAR DONALDSONVILLE, LOUISIANA.

FERTILIZER-DISTRIBUTER.

SPECIFICATION forming part of Letters Patent No. 453,799, dated June 9, 1891.

Application filed February 24, 1891. Serial No. 382,528. (No model.)

*To all whom it may concern:*

Be it known that I, CHRISTIAN SCHMALZRID, a citizen of the United States, residing near Donaldsonville, in the parish of Assumption and State of Louisiana, have invented certain new and useful Improvements in a Fertilizer-Distributer; and I do declare the following to be a full, clear, and exact description of the invention, such as will enable others skilled in the art to which it appertains to make and use the same.

My invention relates to an improvement in a fertilizer-distributer, and its novelty will be fully understood from the following description and claims when taken in connection with the annexed drawings; and the objects of my invention are to provide a device that will thoroughly agitate the fertilizer and enable same to be distributed. I attain these objects by the mechanism illustrated in the accompanying drawings, in which—

Figure 1 is a side view. Fig. 2 is a rear view. Fig. 3 is a front view of clutch-lever for wheel. Fig. 4 is a front view of lever for slide. Fig. 5 is a top view of agitators. Fig. 6 is a rear view of agitators. Fig. 7 is a top view of slide. Fig. 8 is an end view of agitators.

Similar letters and figures refer to similar parts throughout the several views.

In the drawings, A refers to a pole. B are side bars, which are connected by means of cross-pieces C and D; E, body or receptacle in which is placed material to be distributed; F, a clutch-lever for controlling action of agitators on shaft O, and G a lever attached to front portion of E by means of clamp H and connected to arm K of slide S and by pressure upon said lever controls the action of S.

Resting under body E is a metal frame-piece or seat L, the latter being attached to cross-pieces B, and the body E being secured in the rear to L by means of brace T.

Resting upon axle of wheels N are circular concaved cams M, which press upon agitator-shaft O when wheels N are rotated and give a reciprocating motion to said shaft, by which means the agitators 3 and 4 render effective service. Agitators 3 are held in a vertical position, while agitators 4 are held in a horizontal position by means of screws 5.

Resting on axle and in close proximity to wheel N, as shown in Fig. 2, is a metal ring P, upon which are metal rods or projections Q, placed in such a manner upon axle as to act in unison with one of the circular dished cams M, unless prevented by use of clutch-lever F. The ring P and clutch are held in position by means of collars 1, and by means of clamp 2 the lever F is held to body E. Adjusted to L by suitable means are chutes R, and resting over inlets of chutes is slide S, with apertures in same, as shown in Fig. 7, the slide being connected with lever G, that device controlling its action.

In practice the material to be distributed as a fertilizer is placed within the body E, the slide S resting over the inlets of chutes R. When it is desired to distribute the fertilizer by means of lever G, the slide S is moved so as to permit the material to be distributed to flow through chutes R. As the wheels N rotate the cams M impinge against end of shaft O, to which agitators are attached, and cause an oscillating motion to be given by said shaft, and by this means all caking of the material is prevented and a thorough distribution is effected.

Having described my invention, what I claim, and desire to secure by Letters Patent, is—

In a fertilizer-distributer, the combination, with a wheel-axle and the main frame mounted thereon and supporting a body or receptacle, of a transverse shaft taking through the body and extending outside the side walls thereof, plates fixed on said shaft and arranged alternately at right angles to each other, circular dished cams fixed on the wheel-axle and adapted to bear against and reciprocate the plate-carrying shaft, tubes or chutes depending from the bottom of the body and having slots adjacent their upper end, the U-shaped slide moving in suitable guides and having its branches provided with apertures and adapted to take through the slots in the depending tubes or chutes, the forwardly-extending threaded rods connected to the slide and taking through a staple-guide, a nut adapted to regulate the adjustment of the slide, and a lever pivotally connected to the front wall of the body and having its lower end forked to engage and move the U-shaped slide, substantially as and for the purpose set forth.

In testimony whereof I affix my signature in presence of two witnesses.

CHRISTIAN SCHMALZRID.

Witnesses:
PERCY D. PARKS,
WILLIAM GÖELTZ.